United States Patent [19]

Shook

[11] Patent Number: 5,110,241
[45] Date of Patent: May 5, 1992

[54] MILLING MACHINE VISE LIFTER AND STORAGE APPARATUS

[76] Inventor: Robert E. Shook, P.O. Box 0857, Painesville, Ohio 44077

[21] Appl. No.: 713,268

[22] Filed: Jun. 11, 1991

[51] Int. Cl.$^5$ ............................................. B23Q 3/00
[52] U.S. Cl. ................................. 409/235; 248/124; 248/284
[58] Field of Search ................ 248/122, 124, 284; 409/64, 219, 235

[56] References Cited

U.S. PATENT DOCUMENTS

| | | | |
|---|---|---|---|
| 2,650,521 | 9/1953 | Steinbrecker | 409/235 |
| 3,166,986 | 1/1965 | Smith | 409/235 |
| 4,185,801 | 1/1980 | Plymoth | 248/122 |

*Primary Examiner*—Daniel W. Howell
*Attorney, Agent, or Firm*—Donald A. Bergquist

[57] ABSTRACT

A lifting and storage apparatus is disclosed for handling a vise attachment for a vertical turret milling machine. The lifting means includes an articulated support arm that is adapted to attach at one end thereof to the glide or way provided on such machines for support and axial movement of the motorized milling tool. The articulated support is adapted at the distal end thereof to be clamped within the jaws of the vise attachment for support of the vise attachment when the movable bed of the milling machine is lowered. The articulation of the support arm allows free movement in the horizontal plane only; therefore, after the bed is lowered, the supported vise may be moved laterally to the side to a new position above the bed or to a storage position that is clear of the bed and of the work area related to the bed.

6 Claims, 2 Drawing Sheets

MILLING MACHINE VISE LIFTER AND STORAGE APPARATUS

INTRODUCTION

A lifting means and storage apparatus is provided for handling a vise attachment for a vertical turret milling machine. The lifting means comprises an articulated support that is adapted to attach at one end thereof to the glide or way provided on such machines for support and axial movement of the motorized milling tool. The articulated support is adapted at the distal end thereof to be clamped within the jaws of the vise attachment for support of the vise attachment when the movable bed of the milling machine is lowered. The articulation of the support allows free movement in the horizontal plane only; therefore, after the bed is lowered, the supported vise may be moved laterally to the side to a new position above the bed or to a storage position that is clear of the bed and of the work area related to the bed.

BACKGROUND

A vertical turret milling machine is a common machine that is used in many machine shops. A key to its popularity is its use in a multitude of ways. To accomplish this flexibility of use, such machines have a generally flat bed that is movable, by means of jackscrews or the like, in three linear dimensions. To hold a workpiece and thereafter to move the workpiece selectively in the three linear dimensions, one of a variety of clamping devices is bolted to the bed, the selection of the device being dependent upon the operation to be performed, the shape of the workpiece, and, in some cases, the mere preference of the operator.

Far and away the most often used clamping device is a simple, straight-jawed vise. Such a vise is the basic clamping device with which all machinists are familiar.

A disadvantage of a machine in which a variety of clamping means is used is in the size and weight of the various clamping means, coupled with the fact that when a change of clamping means is required, the clamping means on the machine must be removed and stored and the newly selected clamping means must be removed from storage and mounted on the machine bed. Thus, it can be seen that a means for safely carrying a frequently-used clamping device and storing this clamping device near the machine while another clamping device is being used on the bed would be a useful means for the machinist using a vertical turret milling machine to employ.

It is therefore an object of this invention to provide apparatus adapted to carry and to store, while adapted to be supported on a vertical turret milling machine, such clamping apparatus as may be frequently used on the bed of such a milling machine.

It is an object of this invention to provide such carrying and storing apparatus that is adapted to be attached to and supported by the glide or way that supports the motorized milling tool.

It is an object of this invention to provide such a carrying and storing apparatus that is articulated for substantially planar motion of the distal end thereof while having plural degrees of freedom to provide such motion.

It is an object of this invention to provide such a carrying and storing apparatus adapted to carry and store plural clamping apparatuses simultaneously.

BRIEF DESCRIPTION OF THE DRAWINGS

FIG. 3 illustrates an alternative embodiment to provide for attaching the invention to a way.

DETAILED DESCRIPTION OF THE INVENTION

Figure 1:
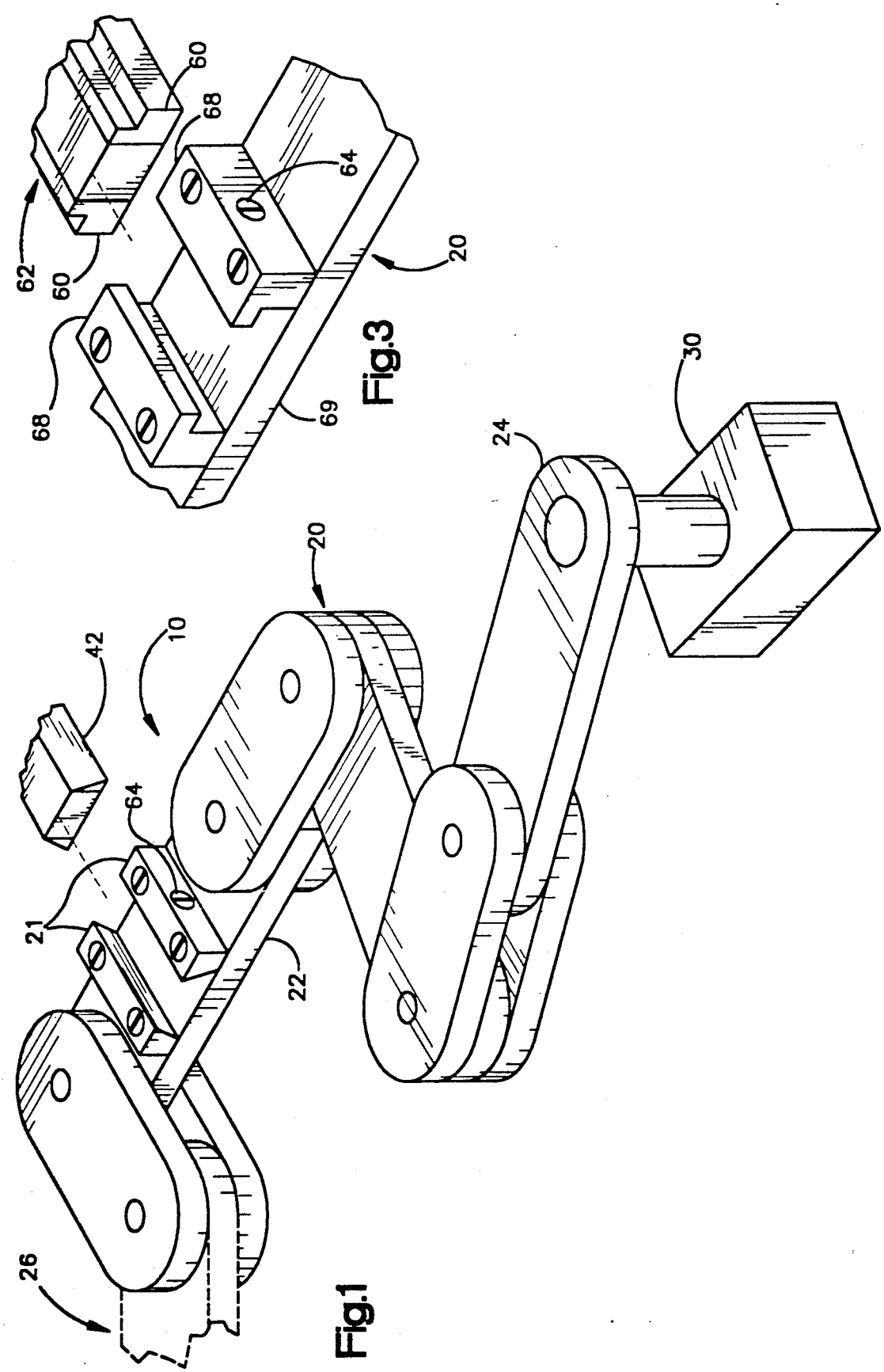
FIG. 1 illustrates the invention itself, separated from any equipment that attaches to it or to which it is to be attached.

FIG. 1 illustrates the present invention, a lifting means and storage apparatus adapted to be attached to a way on a vertical turret milling machine. The lifting means and support 10 comprises at least one articulated support arm 20 that is adapted by a clamping means 21 to attach at one end 22 thereof to the glide or way provided on such machines for support and axial movement of the motorized milling tool. Each articulated arm 20 of the support 10 is adapted at the distal end 24 thereof by means of a grip 30 to be clamped within the jaws of a vise attachment resting upon the movable bed of the milling machine, thereby to support the vise attachment when said movable bed is lowered. In FIG. 1, the presence of a second such articulated support arm is indicated in partial phantom view at 26.

Figure 2:
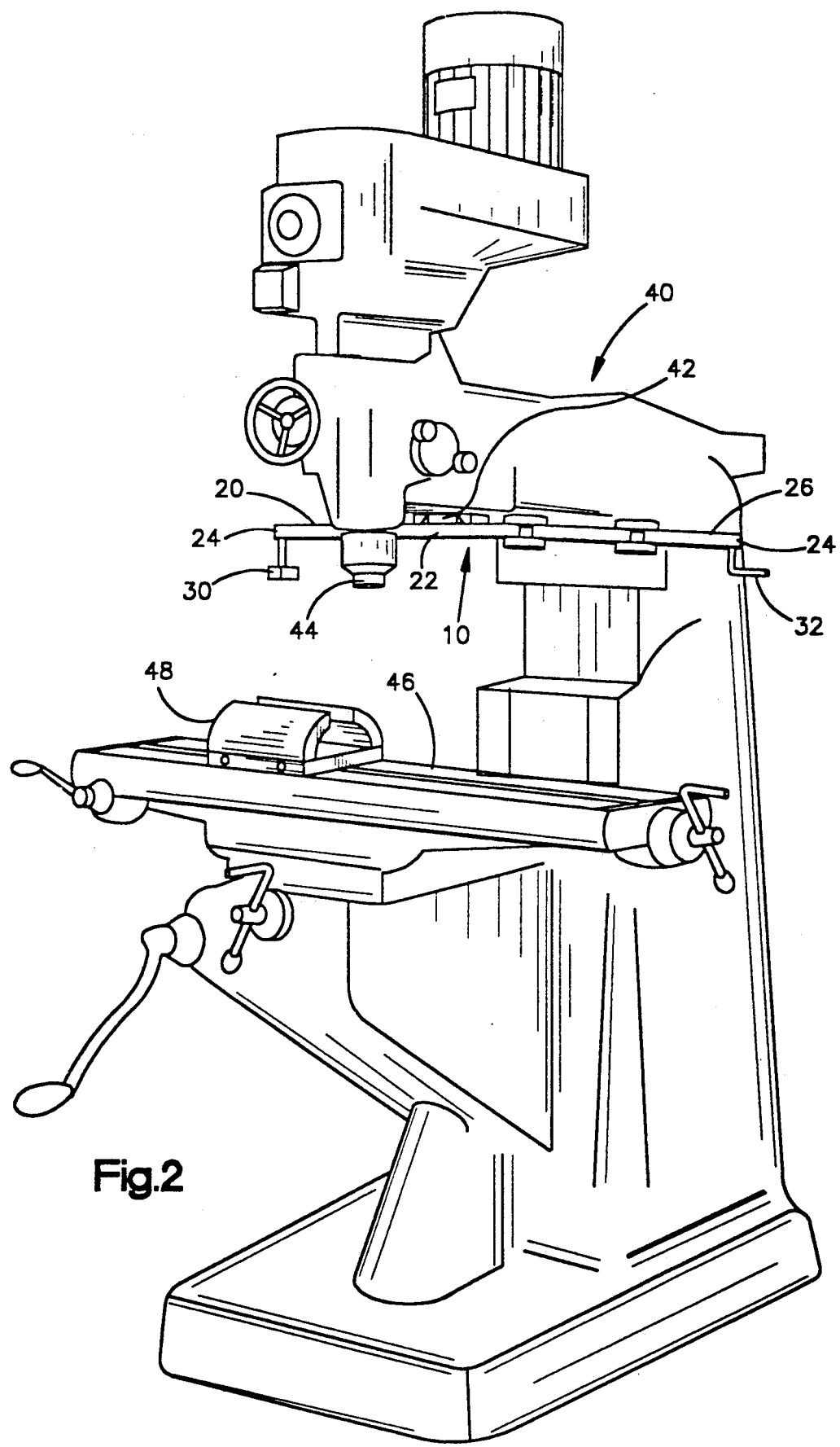
FIG. 2 illustrates an embodiment of the invention in use, showing its relationship to a vertical turret milling machine.

The relationship of the lifting means to a vertical turret milling machine is shown in FIG. 2. The milling machine 40 is shown and those parts that interact with the present invention are identified by numbers. The milling machine has a glide or a way 42 for support and axial movement of the motorized milling tool 44 above the bed 46. The bed 46 is controllably movable in three orthogonal directions by means of jackscrew devices. Generally, rather than clamping a workpiece directly to the bed 46, a machinist will bolt or clamp a vise 48 or other workpiece-grasping adaptor to the bed 46. Different vises may be used, so the vise in use must be unbolted from the bed and moved to a storage location to provide space for another vise. The present invention 10 provides means by which the vise 48 may be supported by the way 42 and moved to the side of the milling machine 40 for storing while suspended from a distal end 24 of the invention.

In FIG. 2, is shown an alternate embodiment of the invention 10, comprising two articulated support arms 20 and 26 that are each adapted to attach at one end 22 thereof to the way 42. One arm 20 is adapted at the distal end 24 thereof by means of a grip 30 to be clamped within the jaws of the vise, now unbolted or unclamped, resting upon the movable bed 46 of the milling machine, thereby to support the vise attachment 48 when said movable bed is lowered. The articulation of the support arm 20 or 26 allows free movement in the horizontal plane only; therefore, after the bed is lowered, the supported vise may be moved laterally to the side to a new position above the bed or to a storage position that is clear of the bed and of the work area related to the bed.

A second arm 26 is adapted at the distal end thereof by means of a horizontal rodlike grip 32 to be clamped withing the jaws of a vise adapted to hold cylindrical workpieces, as are common in the industry. Thus, it is shown that different grip devices may be used to suit the type of vise attachment that may be in use on the milling machine. Other types of grip means are considered obvious from this disclosure.

In the examples illustrated thus far, the way 42 is shown to be of a cross-section commonly known as a "dove-tail". Ways of other designs are used, so an alterantive means of attachment is shown in FIG. 3 for a different common cross-section that might be called an "inverted 'T'" way. In this case, the cross-member 60 of the way 62 is partially surrounded by blocks forming a clamping means 68 attached to the primary element 69 of the articulated support arm 20. In every embodiment of attachment to the way 42 or 62, a clamping screw 64 is neccessary to prevent lateral motion of the clamping means 21 or 68 along the way 42 or 62.

Having described his invention, including a totally functional specific example thereof, applicant desires to include within the scope of his invention those improvements that would be immediately obvious to one skilled in the art, some, but not all of which improvements have been referred to herein. Applicant desires the breadth of his invention to be limited only by the scope of the claims appended hereto.

I claim:

1. For use in combination with a vertical turret milling machine, which milling machine comprises a motorized milling tool movably suspended on a way that extends horizontally above a substantially flat bed upon which a workpiece clamping means rests, said bed being controllably movable in three orthogonal linear directions; an apparatus adapted for attachment to said horizontal way, which apparatus comprises:
   (a) an attachment means including a clamping means that is adapted to fixedly engage said way; and
   (b) a substantially horizontally disposed support arm having a proximal end pivotably connected to said attachment means and having a distal end adapted to be received in clamping jaws of said workpiece clamping means;
thereby, said apparatus provides the capability to support said clamping means as said bed is lowered for the purpose of first disengaging said clamping means from support by said bed, thereby transferring support from said bed to said support arm, and then moving said clamping means supported by said support arm to a storage location where it remains supported by said support arm while remaining clear of said bed, thereby freeing said bed for the installing of other workpiece clamping means.

2. The apparatus of claim 1 wherein said support arm is articulated by means of a pivot comprising a vertically-directed spindle, thereby to provide multiple degrees of freedom in a substantially horizontal plane.

3. The apparatus of claim 1 wherein plural support arms are pivotably connected to the same attachment means.

4. The combination comprising a vertical turret milling machine and an apparatus for lifting and storing an associated vise, said milling machine comprising a motorized milling tool movably suspended on a way that extends horizontally above a substantially flat bed upon which a workpiece clamping means rests, said bed being controllably movable in three orthogonal linear directions, and said apparatus portion of said combination is adapted for attachment to said horizontal way, said apparatus comprising:
   (a) an attachment means including a clamping means that is adapted to fixedly engage said way; and
   (b) a substantially horizontally disposed support arm having a proximal end pivotably connected to said attachment means and having a distal end adapted to be received in clamping jaws of said workpiece clamping means;
thereby, said apparatus provides the capability to support said clamping means as said bed is lowered for the purpose of first disengaging said clamping means from support by said bed, thereby transferring support from said bed to said support arm, and then moving said clamping means supported by said support arm to a storage location where it remains supported by said support arm while remaining clear of said bed, thereby freeing said bed for the installing of other workpiece clamping means.

5. The combination as recited in claim 4 wherein said support arm is articulated by means of a pivot comprising a vertically-directed spindle, thereby to provide multiple degrees of freedom in a substantially horizontal plane.

6. The combination as recited in claim 5 wherein plural support arms are pivotably connected to the same attachment means.

* * * * *